Patented May 5, 1942

2,282,290

UNITED STATES PATENT OFFICE 2,282,290

ANTHELMINTIC TABLET

William Eardley Swales, Ste. Anne de Bellevue, Quebec, Canada, assignor to The Honorary Advisory Council for Scientific and Industrial Research, Ottawa, Ontario, Canada, a corporation of Canada No Drawing. Application July 24, 1940, Serial No. 347,197

5 Claims. (Cl. 167—53)

This invention relates to means for the practical control of nematode parasites in animals such as sheep and more particularly to a convenient and effective product for controlling diseases caused by the presence of these helminth parasites in sheep.

Much effort has been put forth and many anthelmintic drugs have been used in an effort to control these diseases but no entirely satisfactory product has been provided heretofore for use of the farmer or sheep breeder. Phenothiazine has been proposed as an anthelmintic for administration in the feed of swine for the removal of ascarids and nodular worms. It has been demonstrated also that this drug when administered in food to sheep at a dose rate of 0.5 gm. per lb. body weight, and as 20% of a meal of concentrates after a period of fasting showed promise as an anthelmintic for certain parasites.

The object of the present invention is to provide a product, which contains commercial phenothiazine, which may be conveniently administered to the animal and which will rapidly disintegrate into small particles in the intestinal tract of the animal to make the drug quickly available for anthelmintic activity before it is oxidized and absorbed by the body tissues of the animal.

It is known that drugs are readily administered in tablet form. However, applicant has found that to be successfully used as an anthelmintic in this form phenothiazine must be incorporated with reagents which disrupt or explode the tablet into particles for wide distribution in the intestinal tract before the phenothiazine, which oxidizes readily, is oxidized and absorbed by the body tissues of the host animal.

The drug is thus mixed with starch, which swells in the presence of water and other intestinal liquids, sodium bicarbonate and tartaric, or like organic acid, which release carbon dioxide to disrupt the tablet, sodium choleate or dried ox-gall, as a wetting agent, which insures complete disintegration of the tablet into small, wet particles in a very short period after administration, and a laxative which insures dispersion of the drug through the intestinal tract and to the lower part thereof, so that the drug becomes available throughout the intestinal tract to exert its anthelmintic action in all parts thereof. Disintegration is complete in less than seven minutes and before the drug has had an opportunity to become oxidized. Moreover, owing to the dispersion of the drug after disintegration of the tablet the phenothiazine is widely distributed and effectively destroys parasites in all parts of the tract before the drug is absorbed by the body tissues of the animal. Phenolphthalein is the preferred laxative but powdered jalap or calomel may be used.

The preferred composition and proportions are as follows:

| | Parts |
|---|---|
| Commercial phenothiazine | 80 |
| Starch | 8 |
| Sodium bicarbonate | 5 |
| Tartaric acid | 4 |
| Sodium choleate | 2 |
| Phenolphthalein | 1 |

In preparing the tablets the ingredients are weighed into a ball or pebble mill and ground together to intimately and uniformly mix the several ingredients to insure disintegration into uniform particles in the intestinal tract after administration.

The wetting agent is essential to the necessary rapid and complete disintegration of the tablet before the phenothiazine liberated becomes oxidized and absorbed by the tissues. Owing to the insolubility of the drug, which constitutes the bulk of the tablet, tablets without the wetting agent but otherwise the same do not disintegrate even after two hours immersion in water. Tablets without the wetting agent were found intact in the region of the reticulum of animals slaughtered four hours after administration. The wetting agent overcomes the adverse effect of the insolubility of the phenothiazine and the inability of the ruminal liquids to disintegrate a compressed tablet.

Because of the rapidity with which these tablets disintegrate and the dispersion of the phenothiazine, making the anthelmintic drug uniformly available for parasitic consumption, small doses of the drug are effective. As illustrative 0.3 gm. per pound body weight of the animal has been used with great efficiency. When the drug is administered in admixture with the food of the animal consumption is slow and dependent upon the willingness of the animal to consume it in this form and oxidation and absorption by the body tissues of the portion consumed prevents the drug from exerting the full desired effect upon the parasites. In the form of the present invention the drug makes available for the farmer an effective practical and convenient means of control of parasitic diseases in sheep.

I claim:

1. An anthelmintic in the form of a tablet and consisting of substantially 80% of phenothiazine, and intimately mixed therewith starch, carbon dioxide releasing reagents, and sodium choleate as a wetting agent to insure complete disintegration of the tablet.

2. An anthelmintic in the form of a tablet and consisting of substantially 80 parts phenothiazine, 8 parts starch, 5 parts sodium bicarbonate, 4 parts tartaric acid, 2 parts sodium choleate and 1 part phenolphthalein intimately mixed together.

3. An anthelmintic for administration in the form of a tablet which in water disintegrates completely in a few minutes and consisting of a major portion of phenothiazine and a minor portion of a swelling agent, carbon dioxide releasing reagents, sodium choleate to insure complete disintegration of the tablet into small particles and a laxative to insure dispersion of the particles throughout the intestinal tract of a host animal so that they are available for vermicidal effect in the lower bowels before the phenothiazine has been absorbed by the body tissues of the animal.

4. An anthelmintic composition of matter comprising phenothiazine intimately associated with disintegrating and dispersing materials for administration, said materials consisting of a swelling agent, carbon dioxide releasing reagents, sodium choleate as a wetting agent and a laxative, said materials being adapted to disintegrate the composition into small particles within the intestinal tract of a host animal and to disperse the particles throughout the intestinal tract so that they are available for vermicidal effect in the lower bowels before the phenothiazine has been absorbed by the body tissues of the animal.

5. An anthelmintic composition for administration consisting of a major portion of phenothiazine intimately associated in compressed form with a minor portion of disintegrating and dispersing materials, said materials comprising starch, carbon dioxide releasing reagents and dried oxgall to insure rapid disintegration of the composition into small reactive particles within the intestinal tract of a host animal so that the phenothiazine of the small particles is promptly available for vermicidal action.

WILLIAM EARDLEY SWALES.